United States Patent
Allan

(10) Patent No.: US 8,982,689 B2
(45) Date of Patent: Mar. 17, 2015

(54) SPLIT TIEBREAKERS FOR 802.1AQ

(75) Inventor: David Ian Allan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 264 days.

(21) Appl. No.: 13/452,780

(22) Filed: Apr. 20, 2012

(65) Prior Publication Data
US 2013/0279323 A1    Oct. 24, 2013

(51) Int. Cl.
| | |
|---|---|
| G01R 31/08 | (2006.01) |
| H04L 12/707 | (2013.01) |
| H04L 12/703 | (2013.01) |
| H04L 12/761 | (2013.01) |
| H04L 12/721 | (2013.01) |

(52) U.S. Cl.
CPC ............... *H04L 45/24* (2013.01); *H04L 45/16* (2013.01); *H04L 45/28* (2013.01); *H04L 45/38* (2013.01)
USPC ............ 370/216; 370/242; 370/252; 370/351

(58) Field of Classification Search
USPC ......... 370/216, 225, 241, 242, 252, 254, 255, 370/351, 401, 402, 437, 465
See application file for complete search history.

(56) References Cited

U.S. PATENT DOCUMENTS

| | | | |
|---|---|---|---|
| 6,084,858 A | 7/2000 | Matthews et al. | |
| 7,911,944 B2 | 3/2011 | Chiabaut et al. | |
| 8,248,925 B2 | 8/2012 | Allan et al. | |
| 8,509,618 B2 | 8/2013 | Boertjes et al. | |
| 2007/0002770 A1 | 1/2007 | Haalen et al. | |
| 2007/0177527 A1 | 8/2007 | Bragg et al. | |
| 2010/0182934 A1 | 7/2010 | Dobbins et al. | |
| 2011/0026438 A1 | 2/2011 | Farkas et al. | |
| 2011/0060844 A1 | 3/2011 | Allan et al. | |
| 2011/0128857 A1 | 6/2011 | Chiabaut et al. | |
| 2011/0273980 A1 | 11/2011 | Ashwood Smith | |
| 2012/0039161 A1* | 2/2012 | Allan et al. | 370/216 |
| 2012/0057603 A1 | 3/2012 | Allan et al. | |

(Continued)

FOREIGN PATENT DOCUMENTS

WO    WO-2010/104434 A1    9/2010

OTHER PUBLICATIONS

"Draft Standard for Local and Metropolitan Area Networks—Media Access Control (MAC) Bridges and Virtual Bridged Local Area Networks—Amendment 8: Shortest Path Bridging", IEEE P802.1aq/D4.5, Feb. 6, 2012, 359 pages.

(Continued)

*Primary Examiner* — Yemane Mesfin
*Assistant Examiner* — Mon Cheri Davenport
(74) *Attorney, Agent, or Firm* — Blakely, Sokoloff, Taylor & Zafman LLP

(57) ABSTRACT

A node in a communication network selects between equal cost shortest paths (ECSPs) using split tiebreakers. The node advertises multiple system identifiers (IDs) for that node, and each system ID is associated with a different set of traffic IDs that distinguish different virtual networks in the network. The node receives sets of system IDs for each of the other nodes in the network. After constructing a plurality of different ECSPs between two nodes, the node selects one of the ECSPs for each traffic ID used between the two nodes. For a traffic ID, the node constructs path IDs for each of the ECSPs using one system ID of each node in the path that is associated with that traffic ID. Because of the configuration of the system IDs and the traffic IDs in the network, traffic affected by a failure will be distributed across a plurality of surviving ECSPs.

20 Claims, 8 Drawing Sheets

(56) References Cited

U.S. PATENT DOCUMENTS

| | | | |
|---|---|---|---|
| 2012/0063465 A1 | 3/2012 | Keesara et al. | |
| 2012/0281524 A1 | 11/2012 | Farkas | |
| 2012/0307832 A1* | 12/2012 | Allan et al. | 370/400 |
| 2013/0080602 A1 | 3/2013 | Keesara et al. | |

OTHER PUBLICATIONS

"IEEE Std 802.1Qay-2009, IEEE Standard for Local and metropolitan area networks—Virtual Bridged Local Area Networks, Amendment 10: Provider Backbone Bridge Traffic Engineering" Aug. 5, 2009, 145 pages, IEEE, New York, New York, downloaded from http://standards.ieee.org/getieee802/download/802.1Qay-2009.pdf.

D. Fedyk et al., "IS-IS Extensions Supporting IEEE 802.1aq Shortest Path Bridging, draft-ietf-isis-ieee-aq-05.txt" Mar. 8, 2011, 41 pages, Network Working Group, Internet Draft, IETF Trust, downloaded from http://tools.ietf.org/html/draft-ietf-isis-ieee-aq-05.

Peter Ashwood-Smith, "Shortest Path Bridging IEEE 802.1aq Tutorial and Demo", Oct. 2010, 61 pages, downloaded from http://www.nanog.org/meetings/nanog50/presentations/Sunday/IEEE_8021aqShortest_Path.pdf.

David Allan et al., "Shortest Path Bridging: Efficient Control of Larger Ethernet Networks", Oct. 2010, 8 page, IEEE Communications Magazine.

David Allan et al., "IEEE 802.1aq in a Nutshell: Antecedents and Technology" 2012, 35 pages, 802.1aq Shortest Path Bridging Design and Evolution: The Architect's Perspective, First Edition, Chapter 1, 2012 the Institute of Electrical and Electronics Engineers, John Wiley & Sons, Inc.

Non-Final Office Action, U.S. Appl. No. 13/458,675, dated Dec. 23, 2013, 11 pages.

Notice of Allowance, U.S. Appl. No. 12/983,009, dated Jan. 3, 2013, 20 pages.

Allan, David, et al., "Provider Link State Bridging", Sep. 1, 2008, 8 pages, IEEE Communications Magazine, vol. 46, No. 9.

Notice of Allowance, U.S. Appl. No. 12/983,009, dated Jun. 3, 2014, 19 pages.

Notice of Allowance, U.S. Appl. No. 13/458,675, dated May 29, 2014, 6 pages.

\* cited by examiner

SPLIT TIEBREAKERS FOR 802.1AQ

FIELD

Embodiments of the invention relate to the field of computer networking; and more specifically, to the use of split tiebreakers in 802.1aq networks.

BACKGROUND

Ethernet is a networking protocol defined by the Institute of Electrical and Electronics Engineers (IEEE) encompassing standard 802.3, which specifies the physical layer, and 802.1, which specifies the network layer. Ethernet was invented to allow for Local Area Networks (LANs), and allowed "plug and play" networking with little configuration required. Over time, Ethernet was extended to provide additional functionalities and support alternative network topologies. As used herein, the term "Ethernet network" refers to a network which implements one or more of the 802.1 family of protocols including, for example, 802.1, 802.1Q, 802.1ad, 802.1ah, 802.1Qay, 802.1Qbp, or 802.1aq.

IEEE 802.1aq has been developed to support advanced virtualization, enable multipath routing, and simplify the creation and management of carrier, enterprise, and cloud networks. In IEEE 802.1 aq networks, bridges utilize a link state protocol to control forwarding of Ethernet frames by the network by advertising both the topology of the network and logical network membership. Two examples of link state routing protocols include Open Shortest Path First (OSPF) and Intermediate System to Intermediate System (IS-IS), the latter used in 802.1aq networks.

In link state routing networks, the bridges forming the network exchange link state advertisements (LSAs) to enable each node to have a synchronized view of the network topology. Since each bridge in the network has a synchronized view of the topology of the network and complete awareness of the required unicast and multicast connectivity, each bridge can compute one or more shortest paths between any pair of bridges in the network. With this information, each bridge individually populates a forwarding information base (FIB) accordingly.

IEEE 802.1 aq distributes load on the basis of edge-based spreading onto equal cost trees (ECTs) with a single full mesh of the network being deemed an ECT set. Each ECT set is identified in the data plane by being associated 1:1 with a backbone VLAN identifier (B-VID).

Numerous networking applications have an increased dependency upon multipath network designs where multiple equal cost paths will exist between any two points in the network. In most computer networks, a need to accommodate one or more failures in the network is essential to ensure continued availability of the network. In "traditional" 802.1aq networks, a failure of a link or bridge will be observed by one or more surrounding bridges and advertised throughout the network. Each bridge in the network will recalculate a new path for traffic affected by the failure, and forwarding will automatically continue using the new path. However, when there is a failure, the traffic is shifted to a failover path as a block. In networks with sparse connectivity, these consequences are easily understood due to the highly constrained number of alternative paths. In richly connected multipath networks, however, the load between two given points impacted by a failure is shifted to only one of several possible paths instead of being diffused across the surviving set of paths. This may decrease the stability of the network, as the failover path now processes a significant increase in traffic, which can degrade the performance of traffic already on that path, the traffic shifted to that path, and any other traffic utilizing a link or bridge in the affected path. Further, this block shift of traffic to a failover path could so overwhelm links and bridges in the failover path as to effectively make those elements fail. In this manner, it is possible for a cascading network failure due to repeated shifting of blocks of traffic and resulting failover failures. Thus, it would be desirable to have a mechanism that diffuses network load in failure scenarios without rerouting existing unaffected paths, and upon correction of the failure, restores the displaced load back to the original routing.

SUMMARY

According to one embodiment of the invention, a method is performed by a node of a plurality of nodes in a communication network for selecting between equal cost shortest paths in the network using split tiebreakers. A first and second system identifier (ID) for the node is advertised in the network. The first and second system IDs are associated with a first and second set of traffic IDs respectively. These correspond to ECT-sets in 802.1aq parlance. The traffic IDs are used to distinguish different virtual networks within the network and are associated with a tiebreaking transform. The method further includes a step of receiving a third and fourth system ID for each of the other plurality of nodes in the network. The third and fourth system IDs are associated with the first and second set of traffic IDs respectively. The method further includes the steps of constructing a plurality of different equal cost shortest paths between a first node and a second node of the network, and selecting, for each traffic ID, one of the constructed equal cost shortest paths. The selecting is performed in part by constructing a path ID for each of the equal cost shortest paths using the tiebreaking transform associated with that traffic ID and a set of system IDs comprising those of the system IDs associated with that traffic ID. Each of the set of system IDs is associated with a different node of that equal cost shortest path. The selecting is also performed in part by applying a selection algorithm to the path IDs to select one of the equal cost shortest paths. The method further includes the step of distributing, responsive to a failure that affects traffic for a plurality of traffic IDs on one or more selected equal cost shortest paths, traffic associated with those traffic IDs across a plurality of other equal cost shortest paths because of the configuration of the system IDs and the traffic IDs in the network.

According to another embodiment of the invention, a network element coupled to a set of other network elements in a communication network is configured to select between equal cost shortest paths in the network using split tiebreakers. The network element includes a link state protocol module configured to manage a link state database that represents a topology of the network and includes a plurality of network elements and multiple system identifiers (IDs) for each of the plurality of network elements. The link state protocol module is also configured to transmit link state messages using the network to advertise a first and second system ID for the network element, wherein the first and second system IDs are associated with a first and second set of traffic IDs respectively, wherein each traffic ID is used to distinguish different virtual networks within the network, and wherein each traffic ID is associated with a tiebreaking transform. The link state protocol module is also configured to receive link state messages indicating a third and fourth system ID assigned to each of the other plurality of network elements in the network, wherein the third and fourth system IDs are associated with the first and second set of traffic IDs respectively. The link state protocol module is also configured to construct, using information in the link state database, a plurality of different equal cost shortest paths between a first network element and a second network element of the network. The link state protocol module is also configured to construct, for each traffic ID, path IDs for each of the plurality of different equal cost shortest paths using the tiebreaking transform associated with that traffic ID and a set of system IDs comprising those of the system IDs associated with that traffic ID, wherein each of the set of system IDs is associated with a different network element of that equal cost shortest path. The link state protocol module is also configured to select, for each of the traffic IDs, one of the corresponding constructed equal cost shortest paths by applying a selection algorithm to each constructed path ID. The link state protocol module is also configured to cause one or more forwarding entries to be configured to reflect the selected equal cost shortest path. The network element also includes a forwarding module configured to receive a plurality of packets from a port. The forwarding module is also configured to transmit, before a failure in the network that affects traffic for a plurality of traffic IDs on one or more equal cost shortest paths, traffic for the plurality of traffic IDs over the one or more equal cost shortest paths according to the forwarding entries. The forwarding module is also configured to transmit, after the failure, the traffic for the plurality of traffic IDs over a plurality of different equal cost shortest paths because of the configuration of the system IDs and the traffic IDs in the network.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
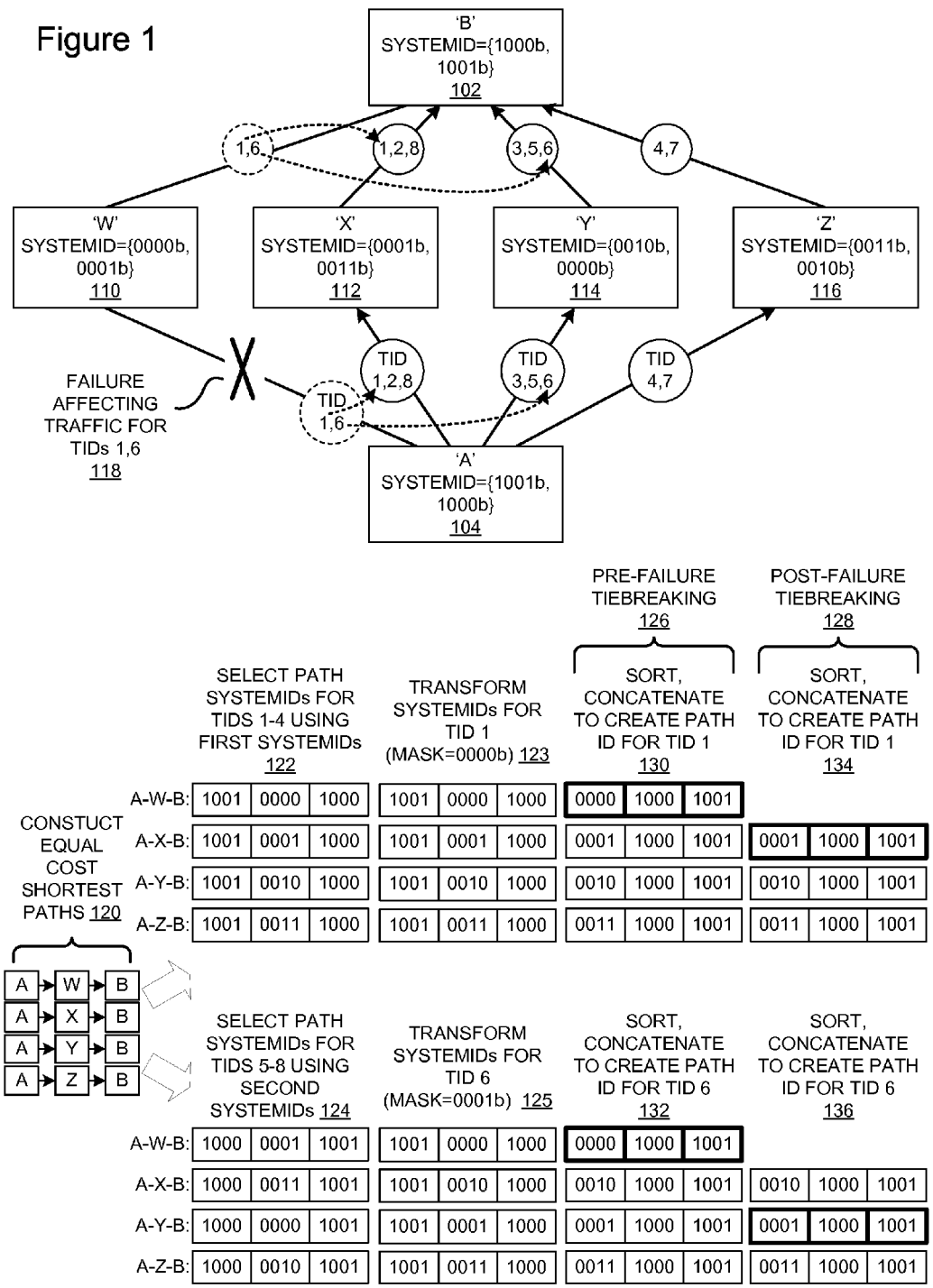
FIG. 1 illustrates an exemplary network and some of the procedures for using split tiebreakers in the example network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge, or generically a node) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some network elements provide support for implementing VPNs (Virtual Private Networks) (e.g., Layer 2 VPNs and/or Layer 3 VPNs). For example, the network elements at the point where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network elements). Layer 2 circuits are configured between the CEs and PEs (e.g., an Ethernet port, an 802.1Q permanent virtual circuit (PVC), an on-demand 802.1Q PVC, a Frame Relay PVC, an Asynchronous Transfer Mode (ATM) PVC). In a Layer 3 VPN, routing typically is performed by the PEs. By way of example, an edge network element that supports multiple contexts may be deployed as a PE; and a context may be configured with a VPN protocol, and thus that context is referred as a VPN context.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

For layer 2 forwarding, the network element can store one or more bridging tables that are used to forward data based on the layer 2 information present in the data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

IEEE 802.1aq has two possible modes of operation. A first mode for VLAN-based networks is referred to as shortest path bridging VID (SPBV). A second mode for MAC-based networks is referred to as shortest path bridging MAC (SPBM). Each ECT set is commonly associated with a shortest path VLAN identifier (SPVID) set for SPBV and with a backbone VLAN identifier (B-VID) for SPBM. Ethernet networks can support more than one ECT set simultaneously in the data plane.

IEEE 802.1aq requires that all nodes between two points in the network independently select the same symmetric path between any two points in the network for a given ECT set. Therefore, an algorithm has been specified such that path selection in IEEE 802.1aq networks utilizes a tiebreaking process such that a path between any two nodes will resolve to a single symmetric path regardless of the direction of computing, order of computing, or examination of any subset of the path. This property is alternatively described as "any portion of the shortest path is also the shortest path." Where a tie occurs along any portion of the shortest path such that there are multiple "equal" choices, those nodes will resolve the tie for the subset of the path with the same choice, the result being a minimum cost shortest path tree. This is referred to herein as the "common algorithm tiebreaking" process. It is possible to manipulate the inputs to the common algorithm tiebreaking process such that multiple ECT sets will be generated, which allows for more efficient use of multipath networks.

In the path selection process, an initial pass of the link state (topology) database utilizing the common algorithm tiebreaking process results in the generation of the first set of trees. The initial step determines the shortest path between each of the node pairs in the network. Where more than one shortest path between any two nodes is found, the common algorithm tiebreaking process is utilized for tiebreaking to generate a unique path selection between each of the node pairs in the network and to generate one or more sets of equal cost forwarding trees, termed an "ECT set" in IEEE 802.1aq.

In traditional 802.1aq SPBM networks, paths are selected for each B-VID in the following manner. First, each node learns the topology of the network using IS-IS link-state routing protocol messages sent between the nodes. Once all of the nodes have learned the topology of the network, shortest paths for unicast and multicast traffic are computed by each node using some shortest path computation algorithm. Such algorithms are well known in the art, and include all-pairs shortest path algorithms (e.g., Floyd-Warshall algorithm, Johnson's algorithm, etc.) and single-source shortest path algorithms (e.g., Dijkstra's algorithm, Bellman-Ford algorithm, etc.). If a node determines that it is on a shortest path between a pair of nodes that participate in a common service (i.e. transmit traffic of a common service using a common B-VID), the node installs forwarding state so that it may forward such traffic accordingly.

However, when there are multiple shortest paths between a pair of nodes that participate in a common service, each node in the network performs a tiebreaking procedure to select a common one of the shortest paths for traffic of that ECT set. This tiebreaking procedure ensures that a network-wide consistent decision is made regarding the one correct path for that traffic to preserve path congruency, thereby providing that paths between any two bridges, in both directions, will share a common route. This procedure, which is a symmetric tiebreaking algorithm, works by constructing a path identifier (path ID) for each of the shortest paths using the system identifier (system ID) from each node in the path and then selecting one of these path IDs according to a particular tiebreaking algorithm. According to the 802.1aq specification, a system ID for each of the nodes in a path is transformed using a mask associated with the B-VID for that ECT set. Each transformed system ID for the path is then concatenated and then lexicographically sorted to form a path ID. These path IDs, which represent the set of potential paths, are ranked and the lowest path ID is selected as the path for traffic in that ECT set. In this manner, all nodes implementing the same logic will choose the same path from the same options, and the exact path of traffic for a given ECT set is therefore predictable, even given changes in the network topology that did not directly impact the path. This procedure also allows for apriori traffic engineering as services of traffic may be selectively assigned to B-VIDs, thereby allowing the system load to be distributed across a plurality of equal cost paths in the network.

In the event of a link or node failure, each node in the network learns of the failure via IS-IS link state messages and re-computes shortest paths for traffic affected by the failure (i.e. traffic that transited over that failed link or through that failed node). For example, if traffic having a particular B-VID transited a particular route affected by a failure, each node in the network would determine that all traffic utilizing that B-VID should be forwarded using a different path. This results in traffic being shifted onto different links and nodes. This approach has a benefit in that the only traffic disrupted in the network is limited to the traffic that transited the failed link or node.

However, this approach also has a significant limitation. Upon a failure in the network, the traffic of the affected B-VIDs on a given shortest path is shifted as a block to a new path and not evenly distributed across the surviving resources. This can create a significant burden on links and nodes in the "new" path for the affected traffic. For example, assuming the network of FIG. 1 with four physical equal cost shortest paths between node A 104 and node B 102, a failure on one of the paths (e.g. A-Y-B) would result in the traffic utilizing that path collectively being shifted to a different path (e.g. A-Z-B). Thus, assuming all traffic was evenly distributed amongst the four equal cost shortest paths before the failure, after the failure path A-Z-B would see a doubling in traffic. This result is troublesome as it can cause a substantial degradation of service for traffic utilizing links on that path and could lead to further network failures and further degradations of service.

FIG. 1 illustrates an exemplary network and logical representations of procedures for using split tiebreakers in an example network according to one embodiment of the invention. This example Ethernet network includes six nodes (e.g. bridges, network elements, etc.) interconnected by links to illustrate one use of split tiebreakers. However, in other embodiments, the network may include more nodes, fewer nodes, or different network topologies such as fat-tree or Clos network architectures.

In this network, node A 104 is an ingress node of the network, and therefore receives traffic from another network (not shown) or generates traffic that is to be sent to other nodes of the network. Here, node A 104 is configured to send traffic to an egress node B 102, which may forward the traffic on to another network (not shown). Nodes A 104 and B 102, as ingress nodes of the network, may be considered Backbone Edge Bridges (BEBs) or Provider Edge network elements.

Between node A 104 and node B 102 are four nodes. These four nodes—node W 110, node X 112, node Y 114, and node Z 116—are each connected to both node A 104 and node B 102 with a set of links. Each of these four intermediate nodes 110-116 may be considered Backbone Core Bridges (BCBs) or Provider network elements.

In this configuration, four different physical paths from node A 104 to node B 102 exist: A-W-B, A-X-B, A-Y-B, and A-Z-B. For illustrative purposes, each of these four paths is defined as being of equal cost. However, in practice, while each of these paths travels from node A 104 to node B 102 through only one node (i.e. one of nodes W-Z 110-116), each of these paths may be deemed to be of different cost by various methods of configuration or determination. For example, a network may be configured to determine that a shortest path is a path transiting the fewest number of nodes, or the shortest path is determined based upon the bandwidth of links in the paths or by configured "weights" assigned to each link or node.

Thus, this network includes four physical equal cost shortest paths between node A 104 and node B 102. According to 802.1aq SPBM, one of these shortest paths will be selected for a packet from node A 104 destined to node B 102 according to a B-VID associated with that packet that identifies the associated ECT set. For example, upon entering a SPBM network, packets are encapsulated in an 802.1ah header 340 (see FIG. 3, to be discussed later herein) that includes a B-VID header field. This B-VID, which is also generically referred to herein as a traffic identifier (traffic ID, or TID), is used by each node of the network to determine one shortest path for traffic of that B-VID from a source to a destination when more than one equal cost shortest path exists.

According to an embodiment of the invention, network traffic can be quickly and simply distributed across multiple surviving equal cost shortest paths in the event of a failure through the use of split tiebreakers. Among other benefits, split tiebreakers provide a substantial benefit as after a failure, portions of the affected traffic are shifted to multiple surviving paths, thereby reducing the impact on each surviving link and node. The use of split tiebreakers also retains the benefit of path determinability of traditional 802.1aq networks, as both the pre-failure paths and post-failure paths are determinable and configurable through the selective assignment of services and B-VIDs to traffic. A basic mechanism for these benefits is to configure the distribution of system IDs in each set such that the secondary path, or "other than preferred path", choice during tiebreaking will be diverse from that of the other system ID sets. When a failure occurs, multiple ECT sets will be impacted and because the system IDs have been selected in such a manner that they do not have a common "next best" choice, the traffic affected by the failure is distributed across more than one surviving path. A prerequisite to the technique is the generation of sets of system IDs such that on any single failure the impacted ECT sets associated with the set of tiebreakers which would cause particular paths to be selected to be evenly distributed across the set of surviving resources. For a simple network such as a 3-stage CLOS architecture, this can be demonstrated to be a trivial exercise; for arbitrary topologies more complex algorithms may be required to determine the distribution of values in each set.

One use of split tiebreakers according to an embodiment of the invention is depicted in the example simple network of FIG. 1. As described above, this network includes six nodes and four physical equal cost shortest paths between node A 104 and node B 102. In this example, traffic represented by eight different traffic IDs (i.e. B-VIDs) is forwarded from node A 104 to node B 102 using eight virtual equal cost shortest paths that resolve to the four physical equal cost shortest paths. This example illustrates the operation of the network with split tiebreakers before and after a failure 118 that affects one of the shortest paths. Of course, split tiebreakers can be configured to work in networks with more or fewer nodes, more or fewer traffic IDs, and for scenarios having more or fewer shortest paths between a pair of nodes.

While traditional 802.1aq networks use the system ID assigned to each node when constructing path identifiers, an implementation of split tiebreakers assigns more than one system ID to the nodes in the network. Each system ID for a node is used when constructing path identifiers for a particular set of one or more traffic IDs. Thus, when creating path identifiers for a first traffic ID, a first system ID for each of the nodes is used. However, when creating path identifiers for a second traffic ID, a second system ID will be used from each of the nodes in that path. According to an embodiment of the invention, the plurality of system IDs for each node may be manually assigned by a network administrator or assigned by a software tool or hardware element on the network. Similarly, the mapping between a set of traffic IDs and the certain one of the set of system IDs for a node to be used when determining shortest paths also may be manually assigned by a network administrator or assigned by a software tool or hardware element on the network.

In FIG. 1, eight virtual equal cost shortest paths are constructed between node A 104 and node B 102 by each node in the network. The eight virtual equal cost shortest paths constructed in FIG. 1 include two instances assigned to each of the four physical paths 120 A-W-B, A-X-B, A-Y-B, and A-Z-B corresponding to traffic IDs 1 through 8. To select one of the shortest paths for traffic with a traffic ID of 1, path identifiers for each path are constructed 122 using a first system ID associated with each of the nodes in each of the paths. In this network, the first system ID of each node is associated with traffic IDs 1-4, and the second system ID of each node is associated with traffic IDs 5-8. In alternative embodiments, there may be more than two system IDs assigned to each node, and the traffic IDs associated with each of the system IDs may be different or may be more or fewer in number. The choice between these options and the configuration thereof may be different for different network topologies and scenarios and create different benefits depending upon the network.

For the first path, A-W-B, the first system ID assigned to each node is selected 122. For node A 104 this is 1001b, for node W 110 this is 0000b, and for node B 102 this is 1000b. These system IDs are then transformed. For example, FIG. 1 illustrates transforming 123 each system ID using a transform associated with traffic ID 1. In this example, the transform is an application of a mask to the system ID via an "exclusive OR" (XOR) operation, where the mask associated with traffic ID 1 is a mask of 0000b. Each transformed system ID 123 is then lexicographically sorted and concatenated 130 to construct a path ID of 0000/1000/1001b. This procedure is repeated for each of the other three equal cost shortest paths. For example, for path A-Z-B, the first system ID 1001b for node A 104 is identified, the first system ID 0011b for node Z 116 is identified, and the first system ID is 1000b for node B 102 is identified. These identified system IDs are transformed, lexicographically sorted, and concatenated to form the path ID 0011/1000/1001b.

After each of the four path IDs have been constructed according to this process, they are ranked and the path ID with the lowest value is selected and the equal cost shortest path associated with that path ID is determined to be the path for traffic of that traffic ID. In this example, the path IDs are compared by treating each bit pattern as a binary unsigned integer, but in other embodiments of the invention, other methods of comparing path IDs are possible and well known in the art. Here, the path ID for the path A-W-B is smaller than the other three path IDs, so traffic for traffic ID 1 will be routed in this network using path A-W-B. This process is repeated for each of the traffic IDs 2-4.

The tiebreaking algorithm for traffic IDs 5-8, on the other hand, relies upon a different set of system IDs to represent the bridges in each equal cost shortest path. To select one of the four physical equal cost shortest paths for traffic IDs 5-8, the second system ID assigned to each node is selected 124. For example, the path ID for path A-W-B is now constructed using the second system ID 1000b for node A 104, the second system ID 0001b for node W 110, and the second system ID 1001b for node B 102.

Before a failure in the network 118, one of the four constructed paths is selected for each of traffic IDs 5-8 using a tiebreaking algorithm and transform associated with that particular traffic ID. In FIG. 1, this process is illustrated for traffic ID 6, which is associated with a mask of 0001b. Thus, each of the second system IDs in that path is transformed 125 by XORing the system ID against the mask 0001b. This results in the original system IDs for path A-W-B 1000/0001/1001b being transformed to 1001/0000/1000b: the first four bits of the result occur because 1000b XOR 0001b=1001b, the middle four bits of the result occur because 0001b XOR 0001b=0000b, and the last four bits occur because 1001b XOR 0001b=1000b. Each transformed set of system IDs is then lexicographically sorted and concatenated 132 to form a path ID to be used in tiebreaking for the specified traffic ID.

For traffic ID 6, this procedure occurs for each of the other three equal cost shortest paths. After path IDs have been constructed for each of these four equal cost shortest paths, tiebreaking occurs 126 by selecting the path ID with the lowest value and the equal cost shortest path associated with that path ID is determined to be the path for traffic ID 6. In this example, the lowest path ID is 0000/1000/1001b for the path transiting nodes A-W-B. This process is repeated for each of the traffic IDs 6-8, each time using the second system ID of each node in each path along with the transform associated with that particular traffic ID.

At the end of the pre-failure 126 selection of shortest paths for both traffic IDs 1-4 and 5-8, traffic for traffic IDs 1 and 6 transits the A-W-B path, traffic for traffic IDs 2 and 8 transits the A-X-B path, traffic for traffic IDs 3 and 5 transits the A-Y-B path, and traffic for traffic IDs 4 and 7 transits the A-Z-B path. Each node in the network has independently computed these paths and installed the proper forwarding state used to implement these forwarding procedures.

At some point, a failure occurs 118 in the network that affects the link between nodes A 104 and W 110. At least one of node A 104 and node W 110 floods advertisements throughout the network indicating the loss of this link. With this information, each node in the system removes the link (or the validity of the link) from its link state database. As a result, traffic for traffic IDs 1 and 6 no longer has a valid path through the network, and a new path for each traffic ID is determined by each node.

To determine the new path for each of traffic IDs 1 and 6, each node again constructs equal cost shortest paths, constructs path IDs for each constructed equal cost shortest path using the transform for that traffic ID, and applies the common tiebreaking algorithm to select the paths. For example, assuming no other network changes aside from the failure 118, equal cost shortest paths will be constructed as in 120 but the first path A-W-B will no longer exist. For traffic ID 1, system IDs will be selected using the first system ID of each node in these paths 122 (again, the path ID for path A-W-B will not be constructed). Each of the system IDs will be transformed 123 using the transform associated with traffic ID 1, which is the mask 0000b. In this post-failure state, the transformed system IDs are lexicographically ordered and concatenated 134 to create path IDs, and the lowest path ID is selected 128. Traffic for traffic ID 1 will now transit the path A-X-B.

Similarly, for traffic ID 6, system IDs will be selected as in 124 using the second system ID of each node in the paths, although the path for A-W-B will not exist. Each of the second system IDs is transformed using the mask of 0001b associated with traffic ID 6 125. In this post-failure state, the transformed system IDs are lexicographically ordered and concatenated to form path IDs 136, and then the lowest resulting path ID is selected 128. Traffic for traffic ID 6 will now transit the path A-Y-B.

This result illustrates one benefit resulting from the use of split tiebreakers. According to the operation of traditional 802.1aq, all traffic transiting the A-W-B path, upon the failure 118 would likely be shifted to one other surviving path, A-X-B. As a result, this shift of all failure-affected traffic onto one other path would significantly increase the load on that path. At best, this degrades the performance of all links and nodes in that path; at worst, it could cause these nodes and links to become so congested that traffic might be dropped or failure of nodes or links may occur.

Instead, through purposeful selection of system IDs for the nodes of the system and the careful selection of traffic IDs and transforms for the traffic of the network, a network implementing split tiebreakers is able to gracefully and automatically accommodate failure by distributing affected traffic across multiple surviving equal cost shortest paths. For example, in FIG. 1 traffic associated with traffic IDs 1 and 6 is not shifted to a same path upon the failure 118; instead, this traffic is distributed among two paths (A-X-B and A-Y-B). Additionally, it is possible to analyze a network's topology and traffic assignments to design a combination of multipathing and split tiebreaker configuration to ensure that upon a link failure, significant diffusion of the traffic will occur amongst the surviving resources in the network.

Further, when failure 118 is corrected, traffic associated with traffic ID 1 and traffic ID 6 will revert back to the original path (A-W-B) while traffic of the other paths will remain unperturbed. This minimizes the possibility of topology change induced re-ordering of packet flows in the network.

As a result, most benefits of hop by hop equal cost multipath routing (ECMP) are duplicated but with much improved preservation of flow ordering in failure scenarios, network predictability, and Operations, Administration, and Maintenance (OAM) utility and testability. Additionally, while systems employing split tiebreakers benefit from the use of more traffic IDs than typically used in traditional 802.1 aq networks, the amount of multicast state in each node's forwarding database is not affected by this increase in traffic IDs. Further, as the exact effect of all failures in any order can be predicted with certainty, network planning is simplified.

Figure 2:
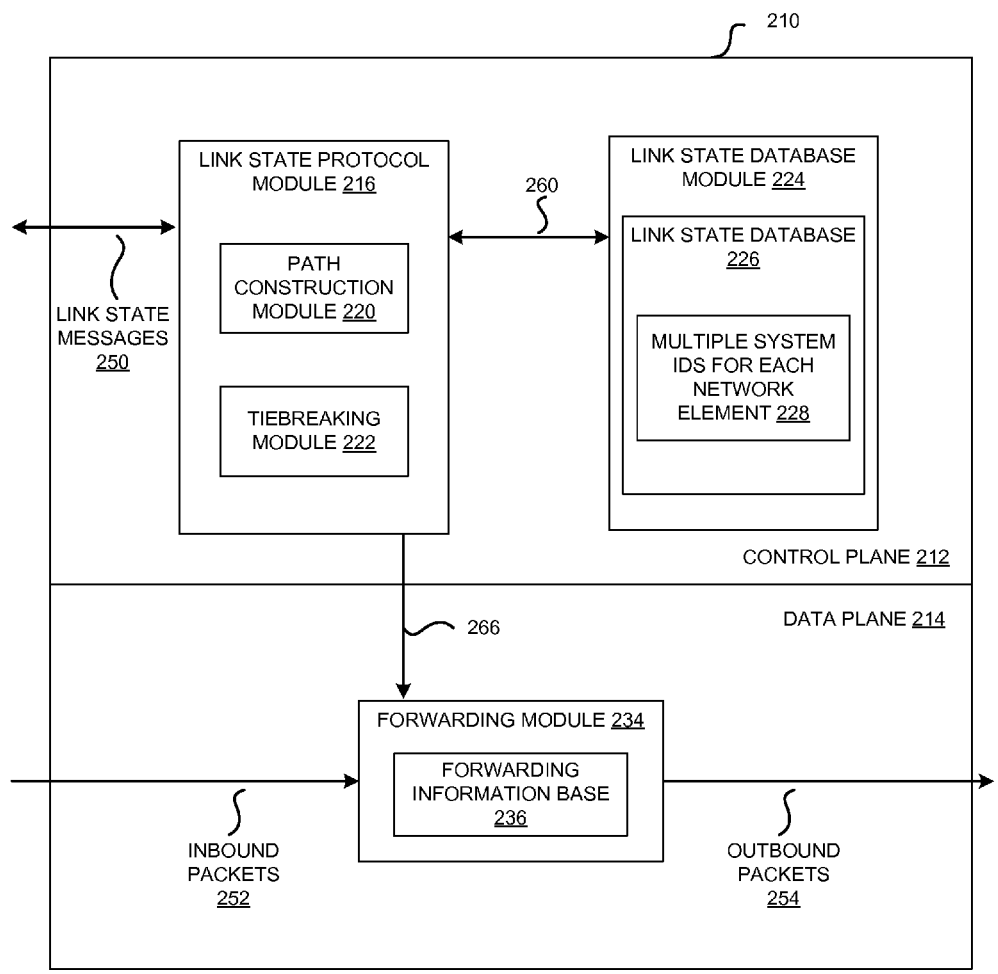
FIG. 2 illustrates an exemplary functional block diagram of a network element that implements split tiebreakers for 802.1aq according to one embodiment of the invention.

FIG. 2 illustrates a functional block diagram of an exemplary network element 210 that implements split tiebreakers for 802.1 aq according to one embodiment of the invention. As depicted in FIG. 2, the network element 210 includes a control plane 212 and a data plane 214. The role of the data plane 214 is to receive inbound packets 252 and forward these packets as outbound packets 254 according to information within a forwarding information base 236. In an embodiment of the invention where the network element 210 functions as a BEB and is therefore located on an edge of a backbone network and interfaces a separate network (e.g., a customer network), the inbound packets 252 arrive from the separate network. In an embodiment of the invention where the inbound packets 252 are 802.1ad packets received from the separate network, the forwarding module 234 may encapsulate the inbound packets 252 with an 802.1ah header before forwarding them as outbound packets 254 to the backbone network. (Further detail regarding 802.1ad packets and 802.1ah packets is presented later herein in regard to FIG. 3.)

Alternatively, in an embodiment of the invention the network element 210 may function as a BEB on the edge of a backbone network and a separate network and may receive inbound packets 252 from the backbone network that are already encapsulated with an 802.1ad header. In this scenario, the forwarding module 234 will decapsulate (i.e. remove) the 802.1ad header from packets before sending the packets as outbound packets 254 to a separate network. In an embodiment of the invention where the network element 210 functions as a BCB and thus is in the core of a backbone network, both the inbound packets 252 and the outbound packets 254 will be 802.1 ad packets and will not be further encapsulated or decapsulated by the forwarding module 234.

The control plane 212 is configured to control the operation of the network element 210. The control plane 212 includes a link state protocol module 216, which, among other functionalities to be discussed later herein, communicates with the other network elements of the network by exchanging (i.e. transmitting and receiving) link state messages 250 amongst the network elements of the backbone network. Link state messages 250 are used in networks employing link state routing protocols such as IS-IS or OSPF to communicate topology information amongst nodes in the network, and such link state routing protocols are well understood by persons of ordinary skill in the art. The exchange of link state messages 250 enables each network element in the network to develop a synchronous understanding of the network topology. In an embodiment of the invention, the link state messages are transmitted according to a version of the IS-IS protocol, such as that described in the Internet Engineering Task Force (IETF) Internet Draft entitled "IS-IS Extensions Supporting IEEE 802.1aq Shortest Path Bridging", Version 5, draft-ietf-isis-ieee-aq-05.txt, Mar. 8, 2001. According to an embodiment of the invention, the underlying IS-IS protocol is further modified to allow each network element to transmit and receive multiple system IDs assigned to a particular network element, instead of simply transmitting only one system ID. This modification is one method to allow for the distribution of multiple system IDs per network element for the purpose of split tiebreaking; however, other methods may be utilized such as manually configuring this information at each network element.

Having received a set of link state messages 250 from the other network elements of the network, the link state protocol module 216 utilizes the information from these link state messages 250 to determine the topology of the network. The link state protocol module 216 stores and retrieves topology information about the network by accessing 260 the link state database module 224. The link state database module 224 includes a link state database 226 that contains entries representing the network elements of the network and the connections between these network elements. In an embodiment of the invention, these network elements are Ethernet bridges and the connections between the Ethernet bridges are Ethernet links. Further, the link state database 226 also stores the multiple system IDs for each network element 228 that are used for split tiebreaking between equal cost shortest paths.

By accessing 260 the stored network topology information in the link state database module 224, the link state protocol module 216 is able to construct shortest paths between network elements using a path construction module 220. In an embodiment of the invention, the path construction module 220 uses an implementation of Dijkstra's algorithm to construct the one or more equal cost shortest paths between pairs of BEBs in the network, and subsequently resolves the intersection set of I-SIDs between a given pair of BEBs assigned to that specific B-VID as part of FIB construction.

When more than one equal cost shortest path is determined to exist between the pair of BEBs by the path construction module 220, the link state protocol module 216 utilizes the tiebreaking module 222 to select one of the determined equal cost shortest paths. In an embodiment of the invention, the tiebreaking module 222 performs tiebreaking for the path between a particular node pair for a particular traffic ID, using the transform associated with the B-VID/traffic ID and the specific one of the multiple system IDs for each network element 228 associated with the B-VID/traffic ID.

After determining shortest paths between network elements of the network, the link state protocol module 216 updates 266 the forwarding module 234 to configure the data plane 214 to forward packets according to the shortest paths. In an embodiment of the invention, the shortest path information is stored in a forwarding information base (FIB) 236, which includes entries mapping one or more input interfaces, destination addresses, and B-VIDs to one or more output interfaces. Upon receipt of additional link state messages 250 indicating a change in the network topology, this process will repeat as the link state protocol module 216 will update the link state database module 224, construct shortest paths, and again update 266 the forwarding module 234.

Figure 3:
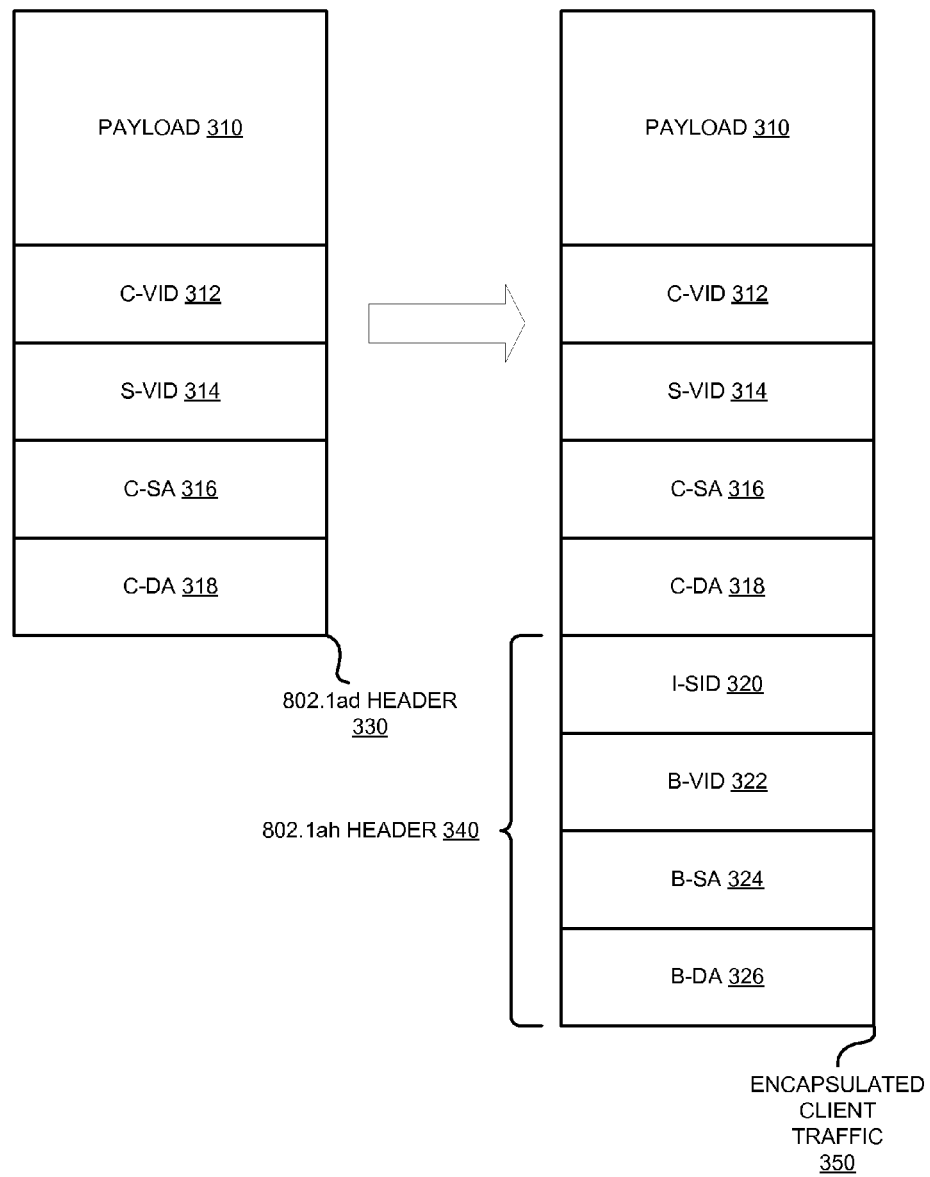
FIG. 3 illustrates packet headers used to encapsulate network traffic according to one embodiment of the invention.

FIG. 3 illustrates packet headers used to encapsulate network traffic according to one embodiment of the invention. As discussed earlier, network elements functioning as BEB devices receive traffic from an external network, which may be a client network. In an embodiment of the invention, Ethernet traffic on the client network will have a payload 310 and a client header 330, including a Client Destination MAC Address (C-DA) 318, Client Source MAC Address (C-SA) 316, and at least one Virtual Local Area Network ID (VID). According to an embodiment of the invention, as illustrated in FIG. 3, the client header includes both an S-VID 314 and a C-VID 312 as detailed by IEEE 802.1ad. In other embodiments of the invention, the client header may only include a C-VID as in 802.1Q. Of course, other Ethernet frame formats may be used by the client network. Upon receipt of client traffic, a BEB network element will encapsulate the traffic 350 with an IEEE 802.1 ah backbone header 340, which allows the network elements of the backbone network to forward traffic based on a backbone-based MAC address space instead of forwarding based on a client MAC address space. The 802.1ah header 330 includes a backbone (B) Destination MAC Address (B-DA) 326, a backbone Source MAC Address (B-SA) 324, a provider VLAN ID (B-VID) 322, and a Service Identifier (I-SID) 320.

The operations of the flow diagram in FIG. 4 will be described with reference to the exemplary embodiments of FIGS. 1, 2, 5, 7, 9, and 10. However, it should be understood that the operations of the flow diagram in FIG. 4 can be performed by embodiments of the invention other than those discussed with reference to FIGS. 1, 2, 5, 7, 9, and 10, and the embodiments discussed with reference to FIGS. 1, 2, 5, 7, 9, and 10 can perform operations different than those discussed with reference to the flow diagram in FIG. 4.

Figure 4:
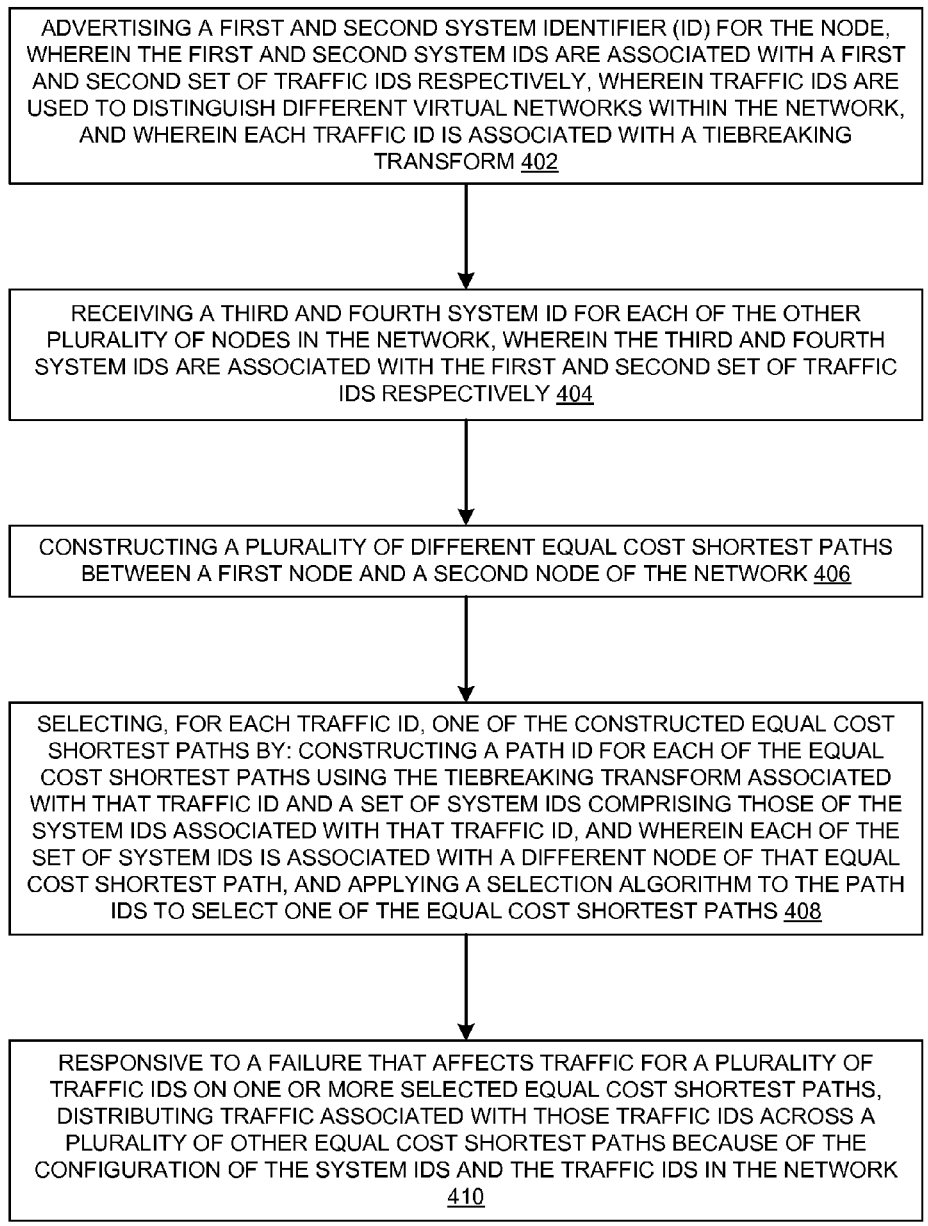
FIG. 4 illustrates a flow diagram for using split tiebreakers in 802.1 aq networks according to one embodiment of the invention.

FIG. 4 illustrates a flow diagram for using split tiebreakers in 802.1 aq networks according to one embodiment of the invention. In block 402, a node in the 802.1aq network advertises a first and second system identifier for the node. The first and second system IDs are associated with a first and second set of traffic IDs respectively. The traffic IDs are used to distinguish different virtual networks within the network, and wherein each traffic ID is associated with a tiebreaking transform. In an embodiment of the invention, more than two system IDs are advertised for the node, where each of the system IDs are associated with different sets of traffic IDs. In an embodiment, the tiebreaking transform is a mask used to transform system IDs within a path ID by performing an XOR operation with the mask and each system ID. In block 404, the node 402 receives a third and fourth system ID for each of the other plurality of nodes in the network. The third and fourth system IDs are associated with the first and second set of traffic IDs respectively. In an embodiment of the invention, more than two system IDs are received for each of the other plurality of nodes in the network, and each of the system IDs for a node is associated with different sets of traffic IDs. In block 406, the node constructs a plurality of different equal cost shortest paths between a first node and a second node of the network. In an embodiment, shortest paths are deemed to be of equal cost when they encompass the same number of links. In an embodiment, shortest paths are determined using link usage statistics. In block 408, the node selects, for each traffic ID, one of the constructed equal cost shortest paths by 1) constructing a path ID for each of the equal cost shortest paths using the tiebreaking transform associated with that traffic ID and a set of system IDs comprising those of the system IDs associated with that traffic ID, and wherein each of the set of system IDs is associated with a different node of that equal cost shortest path, and 2) applying a selection algorithm to the path IDs to select one of the equal cost shortest paths. In block 410, the node, responsive to a failure that affects traffic for a plurality of traffic IDs on one or more selected equal cost shortest paths, distributes traffic associated with those traffic IDs across a plurality of other equal cost shortest paths because of the configuration of the system IDs and the traffic IDs in the network. In an embodiment of the invention, the plurality of system IDs for each node in the network and the selection of traffic IDs and transforms for traffic allows traffic affected by the failure to be distributed across all other surviving equal cost shortest paths for that traffic.

Figures 5, 6:
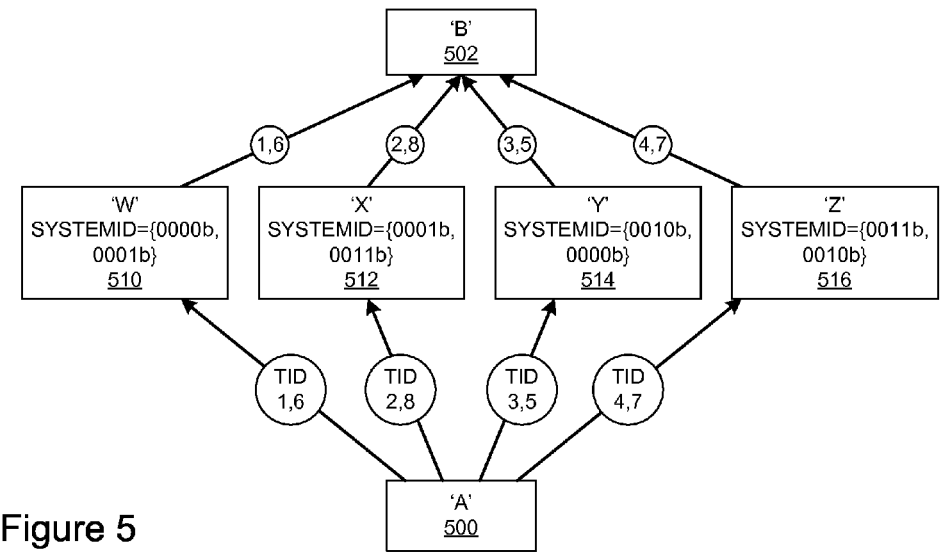
FIG. 5 illustrates an exemplary network topology illustrating shortest paths and traffic identifiers according to one embodiment of the invention.
FIG. 6 illustrates a logical computation of shortest paths utilizing split tiebreakers according to one embodiment of the invention.

FIG. 5 illustrates an exemplary network topology illustrating shortest paths and traffic identifiers according to one embodiment of the invention, and is presented in conjunction with FIG. 6, which illustrates a logical computation of shortest paths utilizing split tiebreakers according to one embodiment of the invention. FIG. 5 depicts a backbone network including six nodes—two BEB nodes B 502 and A 500, and four BCB nodes W 510, X 512, Y 514, and Z 516. Each node includes two system IDs; however, for ease of illustration only the system IDs for the BCB nodes are depicted. This network includes four equal cost shortest paths: A-W-B, A-X-B, A-Y-B, and A-Z-B. The circles in FIG. 5 indicate that traffic associated with traffic IDs has been determined to be forwarded upon a particular path. For example, traffic associated with traffic IDs 1 and 6 is to be forwarded between BEB node A 500 and BEB node B 502 via BCB node W 510.

FIG. 6 presents a conceptual illustration of how traffic associated with traffic IDs 1-8 is selected to travel on the four physical equal cost shortest paths. As detailed above in reference to FIG. 1 and FIG. 2, each node maintains a link state database representing the topology of the network. For a pair of BEB nodes in the network (node A 500 and node B 502), each node calculates equal cost shortest paths between the BEB nodes for each traffic ID used in traffic transiting between the BEB nodes. When a node calculates more than one equal cost shortest path, the node selects one path for traffic having a traffic ID using split tiebreakers.

FIG. 6 includes a first 602A and second 602B table useful in understanding split tiebreaking. Each table includes a header row of system IDs (606, 618) belonging to the intermediate nodes in each of the four equal cost shortest paths. Each row is indexed with a first column of masks 604 associated with each of the traffic IDs. The first table 602A illustrates the use of a first set of system IDs 606 from each intermediate node in the equal cost shortest paths. In this example, each of the first set of system IDs is associated with a set of traffic IDs ranging from 1 to 4. The second table 602B, on the other hand, illustrates the use of a second set of system IDs 618 from each intermediate node in the equal cost shortest paths. This second system ID is associated a set of traffic IDs ranging from 5 to 8. When determining an equal cost shortest path for each of traffic IDs 1-4, the first table 602A and first set of system IDs 606 are used. Similarly, when determining an equal cost shortest path for each of traffic IDs 5-8, the second table 602B and second set of system IDs 618 are used.

When multiple equal cost shortest paths exist between a source and destination node, such as in FIG. 5, path IDs are constructed for each path. For a particular traffic ID, each system ID within each path is transformed using a transform associated with that traffic ID. Each transformed system ID is lexicographically ordered and concatenated to create a path ID, and a lowest path ID is selected as the path for that traffic ID. FIG. 6 (and FIG. 8, to be discussed later herein) illustrates a relevant portion of this process. However, for ease of understanding, complete path IDs are not illustrated in these figures. In particular, the system IDs and transformed system IDs for the transmitting BEB node (in FIG. 5, node A 500) and for the receiving BEB node (in FIG. 5, node B 502) are not illustrated. Because these values will exist in each constructed path ID, these values cancel each other out when compared. For example, when comparing the two paths A-W-B and A-X-B, the only differentiating aspect of each path is the second hop of each path—in this case, node W and node X. For ease of understanding, these superfluous values (e.g. system IDs for nodes A and B) are omitted for the sake of clarity; however, for a full example including such values, see FIG. 1.

The first table 602A illustrates selecting paths for traffic IDs 1-4 according to an embodiment of the invention. The first row 610 illustrates transforming and selecting one of the intermediate node system IDs 606 for traffic ID 1. The transform associated with traffic ID 1 is a mask 0000b, which is XORed with the first of the set of system IDs for node W 510, or 0000b, to yield a result of 0000b. Similarly, the mask 0000b is again applied to the first system ID for each of nodes X 512, Y 514, and Z 516. Each of the results in row 610 represents a transformed system ID. In an embodiment of the invention, each first system ID for each node in each path is transformed in this manner, and the results are lexicographically ordered and concatenated to create path IDs, the lowest of which is selected as the path. For the first row 610, the transformed system ID for node W 510 is selected (represented with a circle) because it has a lowest binary transformed system ID in the row 610. In other embodiments of the invention, the selected path ID may be selected according to another rule or algorithm, such as selecting a highest transformed path ID. Thus, according to the transformed system IDs in the first row 610 representing the four equal cost shortest paths between node A 500 and node B 502, traffic for traffic ID 1 will be forwarded using the A-W-B path. While this procedure is performed by each node in the network, at this point nodes A 500, W 510, and B 502 will configure forwarding information in their respective forwarding information bases 236 to recognize and forward traffic according to this determined path.

This process will be similarly be performed for each of traffic IDs 2-4 in rows two 612, three 614, and four 616. According to this process, traffic for traffic ID 2 will transit the path A-X-B because the transformed system ID for node X 512 of 0000b is the lowest of the second row 612. Similarly, traffic for traffic ID 3 will transit the A-Y-B path and traffic for traffic ID 4 will transit the A-Z-B path.

As the second table 602B illustrates, however, path selection for traffic IDs 5-8 will include transforming a second system ID of a set of system IDs associated with each node in the path. For example, node W 510 in the second table 602B is represented by its second system ID 0001b, while node W 510 in the first table 602A was represented by its first system ID 0000b. In the first row 620 of the second table 602B, path selection for traffic ID 5 is illustrated. The transform for traffic ID 5 is a mask 0000b, which is applied to each of the second system IDs for the intermediate nodes. For example, the second system ID for node W 510 is 0001b, which is transformed by applying the mask 0000b with an XOR operation, which results in 0001b. For node X 512, the second system ID 0011b is XORed with the mask 0000b to result in 0011b. For node Y 514, the second system ID 0000b is XORed with the mask 0000b to result in 0000b. For node Z, the second system ID 0010b is XORed with the mask 0000b to result in 0010b. After each system ID has been transformed in the first row 620 of the second table 602B, the lowest transformed system ID is selected. This lowest value is 0000b, which indicates that the path including node Y 514 (A-Y-B) is the path for traffic using traffic ID 5. Similarly, this process repeats for each of traffic IDs 6-8 and again uses the second of the set of system IDs for each intermediate node. FIG. 5 represents the flow of traffic according to traffic ID at the completion of path selection. Traffic for traffic IDs 1 and 6 transit the A-W-B path, traffic for traffic IDs 2 and 8 transit the A-X-B path, traffic for traffic IDs 3 and 5 transit the A-Y-B path, and traffic for traffic IDs 4 and 7 transit the A-Z-B path.

Figures 7, 8:
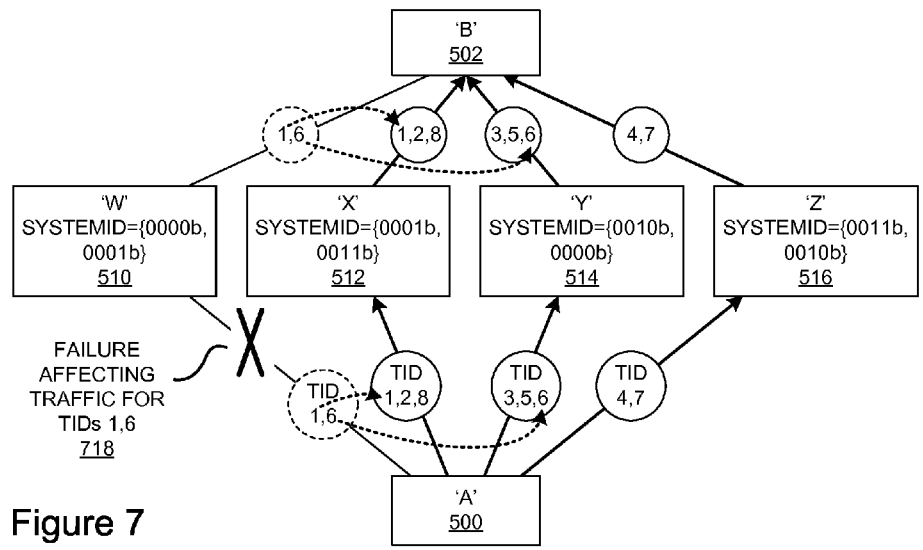
FIG. 7 illustrates the exemplary network topology illustrated in FIG. 5 after a failure according to one embodiment of the invention.
FIG. 8 illustrates a logical computation of shortest paths utilizing split tiebreakers according to one embodiment of the invention.

FIG. 7 illustrates the exemplary network topology illustrated in FIG. 5 after a failure according to one embodiment of the invention, and is presented in conjunction with FIG. 8, which illustrates a logical computation of shortest paths utilizing split tiebreakers according to one embodiment of the invention. Similar to FIGS. 5 and 6, FIGS. 7 and 8 do not illustrate system IDs for nodes A 700 and B 702, and instead only display the system ID and transformed system ID for the intermediate node in each path instead of depicting the entire path ID.

FIG. 7 includes the same nodes as presented in FIG. 5. However, FIG. 7 illustrates the network after a failure 718 occurs that affects traffic for traffic IDs 1 and 6. This failure may occur for many reasons, including but not limited to a physical failure of the link between nodes A 700 and W 710, a failure of one or both of nodes A 700 and B 710, or a problem with a port or network interface card in one or both of nodes A 700 and W 710. In this example network, one or both of nodes A 700 and W 710 detect the failure 718, and will transmit link state messages 250 to the other nodes of the network indicating this failure 718. When each node learns of the failure 718, the node will update 260 its link state database 226 and will compute new paths for traffic IDs 1 and 6.

FIG. 8 presents a conceptual illustration of how traffic associated with traffic IDs 1-8 is selected to travel on the three surviving equal cost shortest paths of FIG. 7. Due to the failure 718, each node will not compute a shortest path through node W 510 when computing paths between node A 500 and node B 502. Thus, the node W 510 columns in the first table 802A and the second table 802B are marked with an 'X' and are not considered. As in FIG. 6, each of the first table 802A and the second table 802B include a first column of masks 804 associated with each of traffic IDs 1-8. Similarly, each table includes a row of system IDs: the first table 802A includes a row 806 including a first of a set of system IDs for each intermediate node, and the second table 802B includes a row 818 including a second of a set of system IDs.

As depicted in the first table 802A, three equal cost paths between node A 500 and node B 502 are computed by each node in the network. The path selection process for each of traffic IDs 1-4 occurs as described earlier in FIG. 6, although now one fewer path possibility exists. In the first row 810, the transform associated with traffic ID 1 is a mask 0000b, which is XORed against each of the first of the set of system IDs 806 for each intermediate node. This transformation results in the transformed system IDs of 0001b for node X 512, 0010b for node Y 514, and 0011b for node Z 516. Of these three possibilities, 0001b for node X 512 is the lowest, so the selected path for traffic ID 1 is now A-X-B. Thus, each of nodes A 500, X 512, and B 502 will configure their respective forwarding information bases 236 to allow traffic associated with traffic ID 1 to be forwarded according to this determined path. This process continues for traffic IDs 2-4 in the second 812, third 814, and fourth 816 rows.

Path selection for each of traffic IDs 5-8 is represented in the second table 802B, which uses the second of the set of system IDs 818 for each intermediate node. For example, the new path for traffic ID 6 is determined in the second row 822 by first transforming each of the system IDs 818 with the transform associated with traffic ID 6, which is a mask of 0001b. By applying the mask to each of the system IDs 818, the transformed system IDs are 0010b for node X 512, 0001b for node Y 514, and 0011b for node Z. Because the transformed system ID for node Y 514 of 0001b is the lowest of the row 822, traffic for traffic ID 6 will be forwarded using node Y 514. Accordingly each of nodes A 500, Y 514, and B 502 will configure their respective forwarding information bases 236 to allow traffic associated with traffic ID 6 to be forwarded according to this determined path. In a similar manner, tiebreaking is also performed for each of traffic IDs 5, 7, and 8 in 820, 824, and 826. As described above, in addition to transforming the second of the set of system IDs for the intermediate nodes, in some embodiments the second of the set of system IDs for node A 500 and node B 502 are also transformed, and all three transformed system IDs are lexicographically ordered and concatenated into a path ID. In those embodiments, each path ID is compared to perform tiebreaking and select the path for the traffic ID.

Due to a proper configuration of the multiple system IDs for each node, the traffic IDs assigned to traffic, and the transforms associated with each of the traffic IDs, split tiebreaking thereby allows for network traffic that used to transit through A-W-B to transit upon two different paths after a failure that impacts the path: A-X-B and A-Y-B. This enables the network to more easily and predictably accommodate failure scenarios by utilizing multiple failover paths through the network for traffic displaced due to failure. Instead of shifting all affected traffic to one other path as a block, the traffic instead is distributed among a plurality of paths, lessening the impact of the failure.

Figure 9:
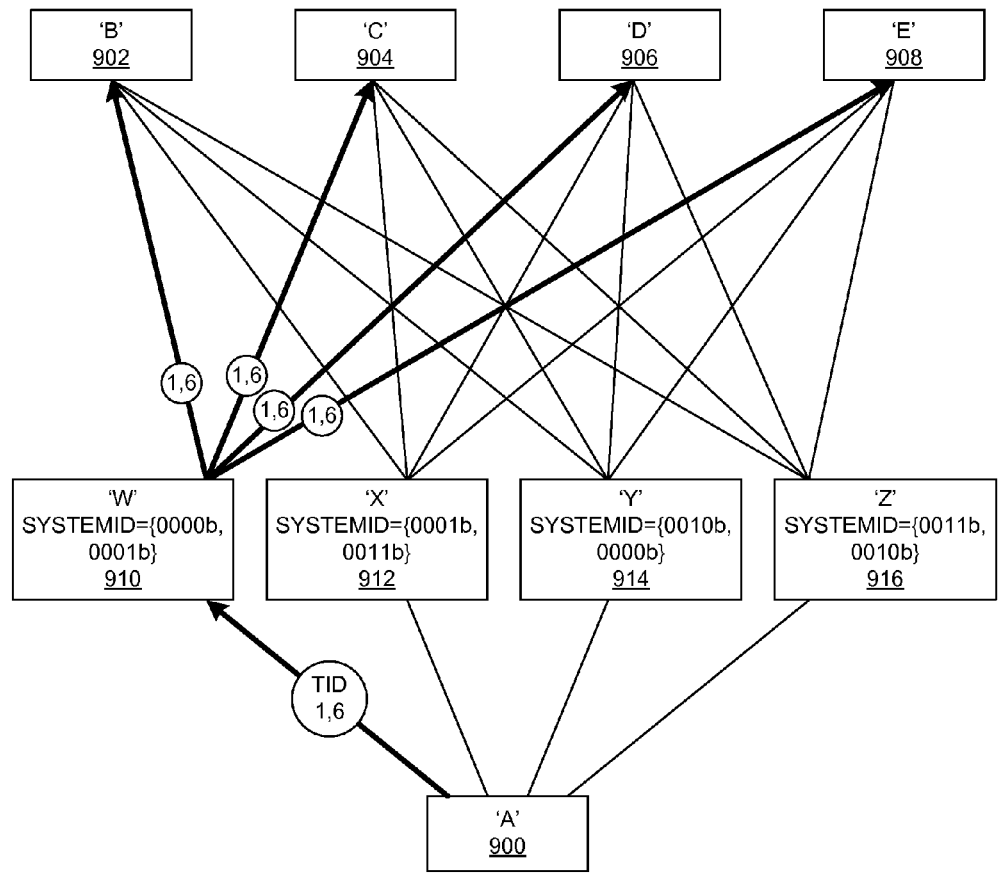
FIG. 9 illustrates shortest paths for multicast traffic on an exemplary network according to one embodiment of the invention.

FIG. 9 illustrates shortest paths for multicast traffic on an exemplary network according to one embodiment of the invention. This illustration depicts traffic utilizing only two traffic IDs (1 and 6) for the sake of clarity; typically such a network will utilize more than two traffic IDs. In this embodiment, node A 900 transmits multicast traffic to node B 902, node C 904, node D 906, and node E 908. Between node A 900 and the recipient nodes 902-908 lies intermediate node W 910, intermediate node X 912, intermediate node 914, and intermediate node 916. In an embodiment of the invention where a number of hops between nodes indicates the cost of a path, four physical equal cost shortest paths are determined to exist between node A 900 and each of the four recipient nodes 902-908. In the same manner of FIG. 5 and FIG. 6, the first system ID of each node in each path is associated with traffic IDs 1-4, and the second system ID of each node in each path is associated with traffic IDs 5-8. Again, for the sake of illustrative clarity, the system IDs for each of node A 900 and the recipient nodes 902-908 are not illustrated. In selecting the paths for traffic ID 1, the first system ID of each of the intermediate nodes 910-916 is transformed using a transform associated with traffic ID 1 (e.g. mask 0000b, not shown). This results in the traffic for traffic ID 1 transiting node W 910, and the paths are determined to be A-W-B, A-W-C, A-W-D, and A-W-E. Similarly, the selection of paths for traffic ID 6 involves transforming a second of the set of system IDs for the intermediate nodes 910-916 using a transform associated with traffic ID 6 (e.g. mask 0001b, not shown). This results in the traffic for traffic ID 6 also transiting node W 910, and the paths are determined to be A-W-B, A-W-C, A-W-D, and A-W-E.

Figure 10:
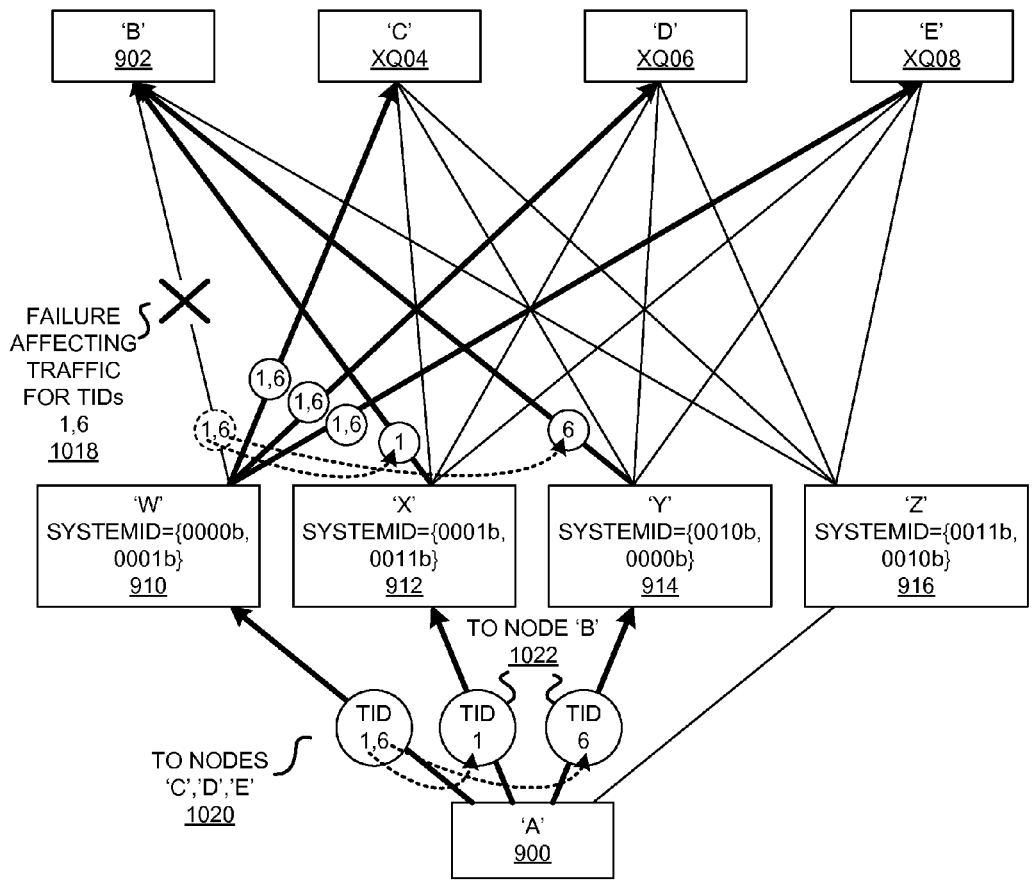
FIG. 10 illustrates different shortest paths for the multicast traffic on the exemplary network of FIG. 9 after a failure according to one embodiment of the invention.

FIG. 10 illustrates different shortest paths for the multicast traffic on the exemplary network of FIG. 9 after a failure according to one embodiment of the invention. In this figure, the failure 1018 that affects traffic IDs 1 and 6 occurs between the intermediate node W 910 and the recipient node B 902. In this scenario, only the traffic for traffic IDs 1 and 6 destined to node B 902 is affected, and traffic for traffic IDs 1 and 6 destined to node C 904, node D 906, and node E 908 will continue to be forwarded 1020 through node W 910. Assuming traffic ID 1 utilizes a mask 0000b as a transform, this mask will be XORed against the first system ID for each of node X 912, node Y 914, and node Z 916. As a result, the lowest transformed system ID will be 0001b for node X 912. Similarly, assuming traffic ID 6 utilizes a mask 0001b, this mask is applied to each second system ID of node X 912, node Y 914, and node Z 916. As a result, the lowest transformed system ID will be 0001b for node Y 914. Accordingly, traffic for traffic ID 1 from node A 900 destined to node B 902 will transit the A-X-B path, and traffic for traffic ID 6 from node A 900 destined to node B 902 will transit the A-X-C path.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, performed by a node of a plurality of nodes in a communication network, for selecting between equal cost shortest paths in the network using split tiebreakers, comprising the steps of:
   advertising a first and second system identifier (ID) for the node, wherein the first and second system IDs are associated with a first and second set of traffic IDs respectively, wherein traffic IDs are used to distinguish different virtual networks within the network, and wherein each traffic ID is associated with a tiebreaking transform;
   receiving a third and fourth system ID for each of the other plurality of nodes in the network, wherein the third and fourth system IDs are associated with the first and second set of traffic IDs respectively;
   constructing a plurality of different equal cost shortest paths between a first node and a second node of the network;
   selecting, for each traffic ID, one of the constructed equal cost shortest paths by:
      constructing a path ID for each of the equal cost shortest paths using the tiebreaking transform associated with that traffic ID and a set of system IDs comprising those of the system IDs associated with that traffic ID, and wherein each of the set of system IDs is associated with a different node of that equal cost shortest path, and
      applying a selection algorithm to the path IDs to select one of the equal cost shortest paths; and
   responsive to a failure that affects traffic for a plurality of traffic IDs on one or more selected equal cost shortest paths, distributing traffic associated with those traffic IDs across a plurality of other equal cost shortest paths because of the configuration of the system IDs and the traffic IDs in the network.

2. The method of claim 1, wherein constructing the plurality of different equal cost shortest paths comprises computing all-pairs shortest paths for the plurality of nodes in the network.

3. The method of claim 1, wherein constructing the path ID for each of the equal cost shortest paths comprises:
   applying the tiebreaking transform associated with that traffic ID to each of the set of system IDs;
   lexicographically ordering each transformed system ID; and
   concatenating the ordered transformed system IDs.

4. The method of claim 1, wherein the selection algorithm comprises:
   ranking the path IDs; and
   selecting a lowest of the ranked path IDs.

5. The method of claim 1, wherein the communication network is an 802.1aq network, and wherein the traffic IDs are backbone virtual local area network identifiers (B-VIDs).

6. The method of claim 1, wherein:
   the failure affects traffic for N traffic IDs on one selected equal cost shortest path, where N is an integer greater than one; and
   traffic for the N traffic IDs is distributed across N different equal cost shortest paths.

7. The method of claim 6, wherein upon restoration of a failed component that caused the failure, the traffic for the N different traffic IDs is forwarded over the one selected equal cost shortest path.

8. A network element, which is to be coupled to a set of other network elements in a communication network, configured to select between equal cost shortest paths in the network using split tiebreakers, the network element comprising:
   a link state protocol module configured to:
      manage a link state database that represents a topology of the network and includes a plurality of network elements and multiple system identifiers (IDs) for each of the plurality of network elements,
      transmit link state messages using the network to advertise a first and second system ID for the network element, wherein the first and second system IDs are associated with a first and second set of traffic IDs respectively, wherein each traffic ID is used to distinguish different virtual networks within the network, and wherein each traffic ID is associated with a tiebreaking transform,
      receive link state messages indicating a third and fourth system ID assigned to each of the other plurality of network elements in the network, wherein the third and fourth system IDs are associated with the first and second set of traffic IDs respectively;
      construct, using information in the link state database, a plurality of different equal cost shortest paths between a first network element and a second network element of the network,
      construct, for each traffic ID, path IDs for each of the plurality of different equal cost shortest paths using the tiebreaking transform associated with that traffic ID and a set of system IDs comprising those of the system IDs associated with that traffic ID, and wherein each of the set of system IDs is associated with a different network element of that equal cost shortest path,
      select, for each of the traffic IDs, one of the corresponding constructed equal cost shortest paths by applying a selection algorithm to each constructed path ID, and
      cause one or more forwarding entries to be configured to reflect the selected equal cost shortest path; and
   a forwarding module configured to:
      receive a plurality of packets from a port,
      transmit, before a failure in the network that affects traffic for a plurality of traffic IDs on one or more equal cost shortest paths, traffic for the plurality of traffic IDs over the one or more equal cost shortest paths according to the forwarding entries, and
      transmit, after the failure, the traffic for the plurality of traffic IDs over a plurality of different equal cost shortest paths because of the configuration of the system IDs and the traffic IDs in the network.

9. The network element of claim 8, wherein the link state protocol module is configured to construct the plurality of different equal cost shortest paths by computing all-pairs shortest paths for the plurality of network elements in the network.

10. The network element of claim 8, wherein the link state protocol module is configured to construct the path IDs for each of the plurality of equal cost shortest paths by:
   applying the tiebreaking transform associated with that traffic ID to each of the set of system IDs;
   lexicographically ordering each transformed system ID; and
   concatenating the ordered transformed system IDs.

11. The network element of claim 8, wherein the selection algorithm comprises:
ranking the constructed path IDs; and
selecting a lowest of the ranked path IDs.

12. The network element of claim 8, wherein the communication network is an 802.1aq network, and wherein the traffic IDs are backbone virtual local area network identifiers (B-VIDs).

13. The network element of claim 8, wherein:
the failure affects traffic for N traffic IDs on one selected equal cost shortest path, where N is an integer greater than one; and
after the failure, traffic for the N traffic IDs is transmitted across N different equal cost shortest paths.

14. The network element of claim 13, wherein upon restoration of a failed component that caused the failure, the traffic for the N traffic IDs is transmitted over the one selected equal cost shortest path.

15. A communication network, comprising:
a plurality of network elements, wherein each network element is communicatively coupled to at least one other network element, and wherein each network element includes a processor and a non-transitory machine-readable medium coupled to the processor and having instructions that, when executed by the processor, cause the processor to select between equal cost shortest paths of the network using split tiebreakers by performing the following operations:
advertising a first and second system identifier (ID) for the network element, wherein the first and second system IDs are associated with a first and second set of traffic IDs respectively, wherein traffic IDs are used to distinguish different virtual networks within the network, and wherein each traffic ID is associated with a tiebreaking transform;
receiving a third and fourth system ID for each of the other plurality of network elements in the network, wherein the third and fourth system IDs are associated with the first and second set of traffic IDs respectively;
constructing a plurality of different equal cost shortest paths between a first and a second network element of the network;
selecting, for each traffic ID, one of the constructed equal cost shortest paths by:
constructing a path ID for each of the equal cost shortest paths using the tiebreaking transform associated with that traffic ID and a set of system IDs comprising those of the system IDs associated with that traffic ID, and wherein each of the set of system IDs is associated with a different network element of that equal cost shortest path, and
applying a selection algorithm to the path IDs to select one of the equal cost shortest paths; and
responsive to a failure that affects traffic for a plurality of traffic IDs on one or more selected equal cost shortest paths, distributing traffic associated with those traffic IDs across a plurality of other equal cost shortest paths because of the configuration of the system IDs and the traffic IDs in the network.

16. The communication network of claim 15, wherein constructing the plurality of different equal cost shortest paths comprises computing all-pairs shortest paths for the plurality of network elements in the network.

17. The communication network of claim 15, wherein constructing the path ID for each of the equal cost shortest paths comprises:
applying the tiebreaking transform associated with that traffic ID to each of the set of system IDs;
lexicographically ordering each transformed system ID; and
concatenating the ordered transformed system IDs.

18. The communication network of claim 15, wherein the selection algorithm comprises:
ranking the path IDs; and
selecting a lowest of the ranked path IDs.

19. The communication network of claim 15, wherein the communication network is an 802.1aq network, and wherein the traffic IDs are backbone virtual local area network identifiers (B-VIDs).

20. The communication network of claim 15, wherein upon restoration of a failed component that caused the failure, the traffic associated with the affected plurality of traffic IDs is forwarded over the one or more selected equal cost shortest paths.

* * * * *

UNITED STATES PATENT AND TRADEMARK OFFICE
CERTIFICATE OF CORRECTION

| | | |
|---|---|---|
| PATENT NO. | : 8,982,689 B2 | Page 1 of 1 |
| APPLICATION NO. | : 13/452780 | |
| DATED | : March 17, 2015 | |
| INVENTOR(S) | : Allan | |

It is certified that error appears in the above-identified patent and that said Letters Patent is hereby corrected as shown below:

In the Drawings

In Fig. 10, Sheet 8 of 8, delete " 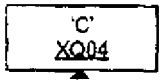 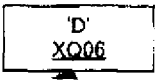 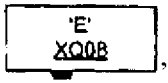 " and insert -- 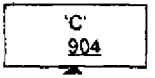 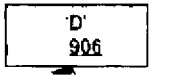  --, therefor.

In the Specification

In Column 17, Line 9, delete "260" and insert -- 266 --, therefor.

Signed and Sealed this
Eleventh Day of August, 2015

Michelle K. Lee
*Director of the United States Patent and Trademark Office*